(12) United States Patent
Kruglick

(10) Patent No.: US 9,124,337 B2
(45) Date of Patent: Sep. 1, 2015

(54) REPEATER EMULATION TO INCREASE NETWORK RANGE

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 54 days.

(21) Appl. No.: 14/128,201

(22) PCT Filed: Aug. 30, 2013

(86) PCT No.: PCT/US2013/057497
§ 371 (c)(1),
(2) Date: Dec. 20, 2013

(87) PCT Pub. No.: WO2015/030789
PCT Pub. Date: Mar. 5, 2015

(65) Prior Publication Data
US 2015/0065033 A1    Mar. 5, 2015

(51) Int. Cl.
*H04B 3/36*     (2006.01)
*H04B 7/145*    (2006.01)

(52) U.S. Cl.
CPC ..................................... *H04B 7/145* (2013.01)

(58) Field of Classification Search
USPC ........... 455/7, 11.1, 15, 550.1, 448, 449, 454; 370/310, 315
See application file for complete search history.

(56) References Cited

U.S. PATENT DOCUMENTS

| 5,185,860 | A | 2/1993 | Wu |
| 7,305,245 | B2 | 12/2007 | Alizadeh-Shabdiz et al. |
| 2004/0223469 | A1* | 11/2004 | Bahl et al. ..................... 370/331 |
| 2005/0237956 | A1 | 10/2005 | Kuperschmidt et al. |
| 2007/0049270 | A1* | 3/2007 | Sawada ....................... 455/432.1 |

(Continued)

FOREIGN PATENT DOCUMENTS

EP       2382840 B1    10/2012

OTHER PUBLICATIONS

Adams, J., "ZigBee's Value to Personal Health Care," The Embedded Beat: Freescale Blog Community, accessed at http://freescalehome.wordpress.com/2009/10/22/zigbees-value-to-personal-health-care/, Oct. 22, 2009, pp. 1-8.

(Continued)

*Primary Examiner* — Fayyaz Alam
(74) *Attorney, Agent, or Firm* — Moritt Hock & Hamroff LLP; Steven S. Rubin, Esq.

(57) ABSTRACT

Technologies are generally described for methods and systems configured to increase a range of a network. In an example, a method for increasing a range of a first network may include sending a request by a communication device to a network device while the communication device is in a range of the first network. The request may include a request for discovery data that identifies the first network. The method may further include receiving, by the communication device, the discovery data. The method may further include broadcasting, by the communication device, information based on the discovery data when the communication device is outside the range of the first network and when the communication device is configured to communicate over a second network. The second network may be different from the first network.

20 Claims, 7 Drawing Sheets

(56) References Cited

U.S. PATENT DOCUMENTS

| | | | |
|---|---|---|---|
| 2008/0261574 | A1 | 10/2008 | Rinta-Aho et al. |
| 2011/0263242 | A1 | 10/2011 | Tinnakornsrisuphap et al. |
| 2012/0026941 | A1* | 2/2012 | Ahmad et al. ............... 370/328 |
| 2013/0012194 | A1* | 1/2013 | Bugenhagen et al. ..... 455/426.1 |
| 2013/0072112 | A1 | 3/2013 | Gunnarsson et al. |
| 2014/0075189 | A1* | 3/2014 | Abraham et al. ............ 713/168 |

OTHER PUBLICATIONS

Hwang, S. and Yu, D., "Remote Monitoring and Controlling System Based on ZigBee Networks," International Journal of Software Engineering and Its Applications vol. 6, No. 3, Jul. 2012, pp. 35-42.

Chen, C.H. et al., "Intelligent Home Energy Conservation System Based on WSN," International Conference on Electrical, Electronics and Civil Engineering, 2011, pp. 166-169.

"Zigbee creating the Home Swarm," Digital Swarm, last updated on Oct. 28, 2009, accessed at http://blog.tmcnet.com/digital-swarm/2009/10/zigbee_creating_the_home_swarm.html, accessed on Nov. 22, 2013, 2 pages.

Curtis, S., "Multi-standard wireless chip launched for the Internet of Things," Network World, Feb. 7, 2013, accessed at http://www.networkworld.com/news/2013/020713-multi-standard-wireless-chip-launched-for-266511.html, downloaded on Nov. 22, 2013, pp. 1-4.

Kee, E., "TazTag TPH-ONE is first NFC and Zigbee Android smartphone in the world," updated on Feb. 27, 2012, accessed at http://www.ubergizmo.com/2012/02/taztag-tph-one-is-first-nfc-and-zigbee-android-smartphone-in-the_world/, downloaded on Nov. 22, 2013, pp. 1-4.

Wilson, J.H., "Apple's iWatch Will Measure More than Time," HBR Blog Network, updated on Mar. 12, 2013, accessed at http://blogs.hbr.org/cs/2013/03/three_clues_on_the_value_of_an.html, downloaded on Nov. 22, 2013, pp. 1-3.

Ergen, S.C., "ZigBee/IEEE 802.15.4 Summary," accessed at http://pages.cs.wisc.edu/~suman/courses/838/papers/zigbee.pdf, Sep. 10, 2004, pp. 1-37.

International Search Report and Written Opinion for International Patent Application No. PCT/US2013/057497 mailed Nov. 7, 2013, 14 pages.

Libelium, Meshlium Xtreme, accessed at www.libelium.com/products/meshlium, downloaded Feb. 18, 2014, 1 page.

Hue Personal Wireless Lighting, "Meet Hue", PHILIPS, 2004-2014, accessed at http://www.meethue.com/en-US, downloaded Feb. 18, 2014, 6 pages.

* cited by examiner

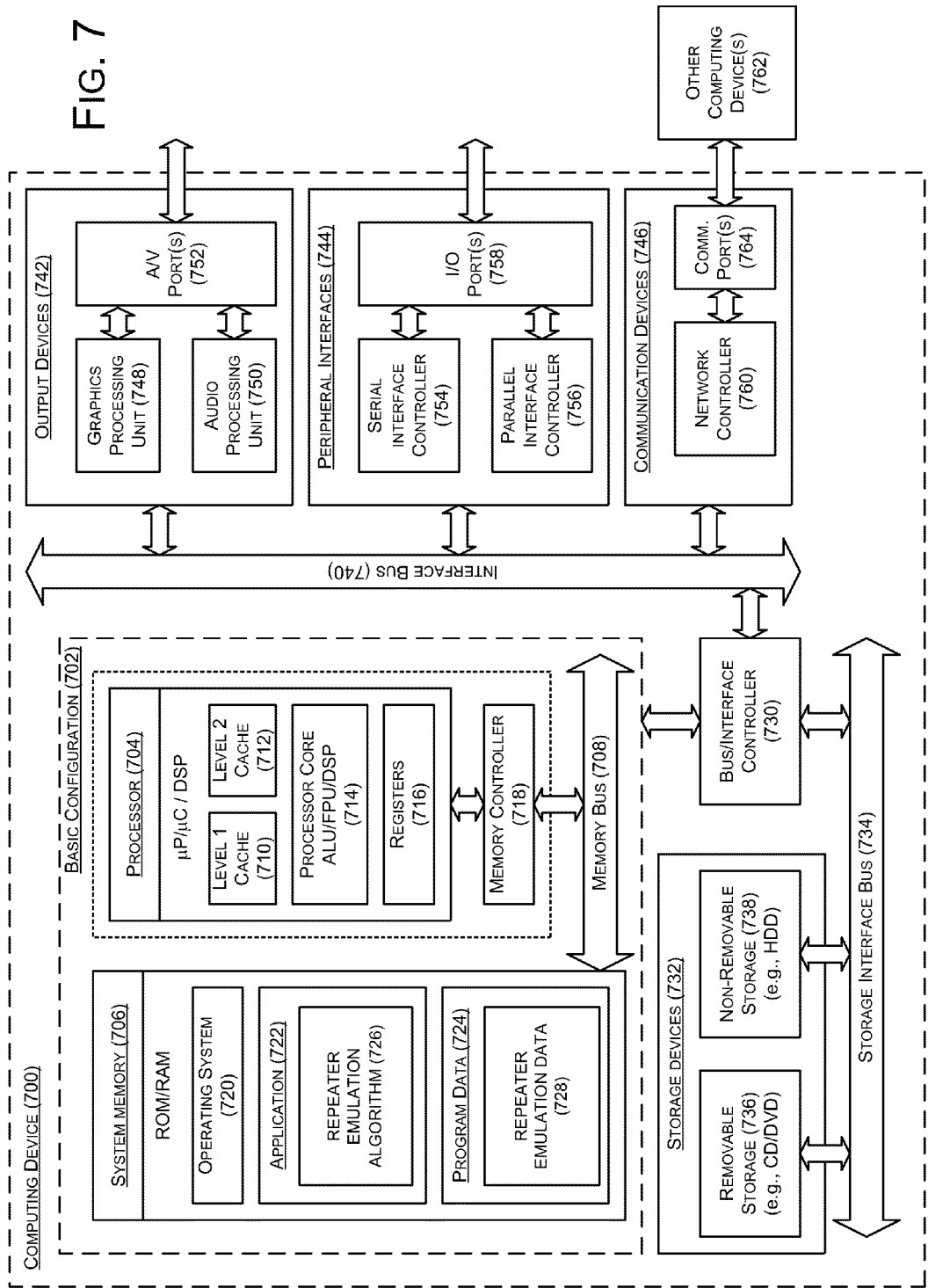

REPEATER EMULATION TO INCREASE NETWORK RANGE

CROSS REFERENCE TO RELATED APPLICATIONS

This application is a U.S. national stage filing under 35 U.S.C. §371 of International Application No. PCT/US13/57497 filed Aug. 30, 2013, the entirety of which is hereby incorporated by reference.

BACKGROUND

Unless otherwise indicated herein, the materials described in this section are not prior art to the claims in this application and are not admitted to be prior art by inclusion in this section.

Devices in a network with limited transmission range typically rely on network devices such as repeaters to transmit data to each other. These devices may include input devices, such as controllers, and/or end devices, such as home appliances and/or sensors. A repeater with additional functionality, such as a base station, may be used to manage communication among repeaters, controllers and/or end devices. Each repeater, controller, and/or end device may have a respective coverage area for data transmission. Repeaters may be configured to relay data among controllers and/or end devices when respective coverage areas are not overlapping.

SUMMARY

In some examples, methods for increasing a range of a network are generally described. The methods may include sending a request, by a communication device, to a network device while the communication device is in a range of a first network. The request may include a request for discovery data that identifies the first network. The methods may further include receiving, by the communication device, the discovery data. The methods may further include broadcasting, by the communication device, information based on the discovery data when the communication device is outside the range of the first network and when the communication device is configured to communicate over a second network. The second network may be different from the first network.

In some examples, devices configured to increase a range of a network is generally described. The devices may include a memory. The devices may further include a first network interface controller. The devices may further include a second network interface controller. The devices may further include a processor configured to be in communication with the memory, the first network interface controller and the second network interface controller. The processor may be configured to generate and send a request through the first network interface controller to a network device while the device is in the range of a first network. The request may include a request for discovery data that identifies the first network. The processor may be further configured to receive the discovery data and store the discovery data in the memory. The processor may be configured to broadcast information based on the discovery data through the first network interface controller when the device is outside the range of the first network and when the device is configured to communicate over a second network through the second network interface controller. The second network may be different from the first network.

In some examples, a system configured to increase a range of a first network is generally described. The system may include an end device. The system may further include a network device in the range of the first network. The network device may be configured to be in communication with the end device. The system may further include a controller. The system may further include a communication device. The communication device may be configured to send a request to the network device while the communication device is in the range of a first network. The request may include a request for discovery data that identifies the first network. The network device may be configured to receive the request and send the discovery data to the communication device in response. The communication device may be further configured to receive the discovery data. The communication device may be further configured to broadcast information based on the discovery data when the communication device is outside the range of the first network and when the communication device is configured to communicate over a second network different from the first network. The communication device may be further configured to receive a signal from the controller. The signal may include a request to communicate with the end device inside the range of the first network. The communication device may be further configured to transmit the signal to the network device through the second network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement repeater emulation to increase network range;

Figure 1:
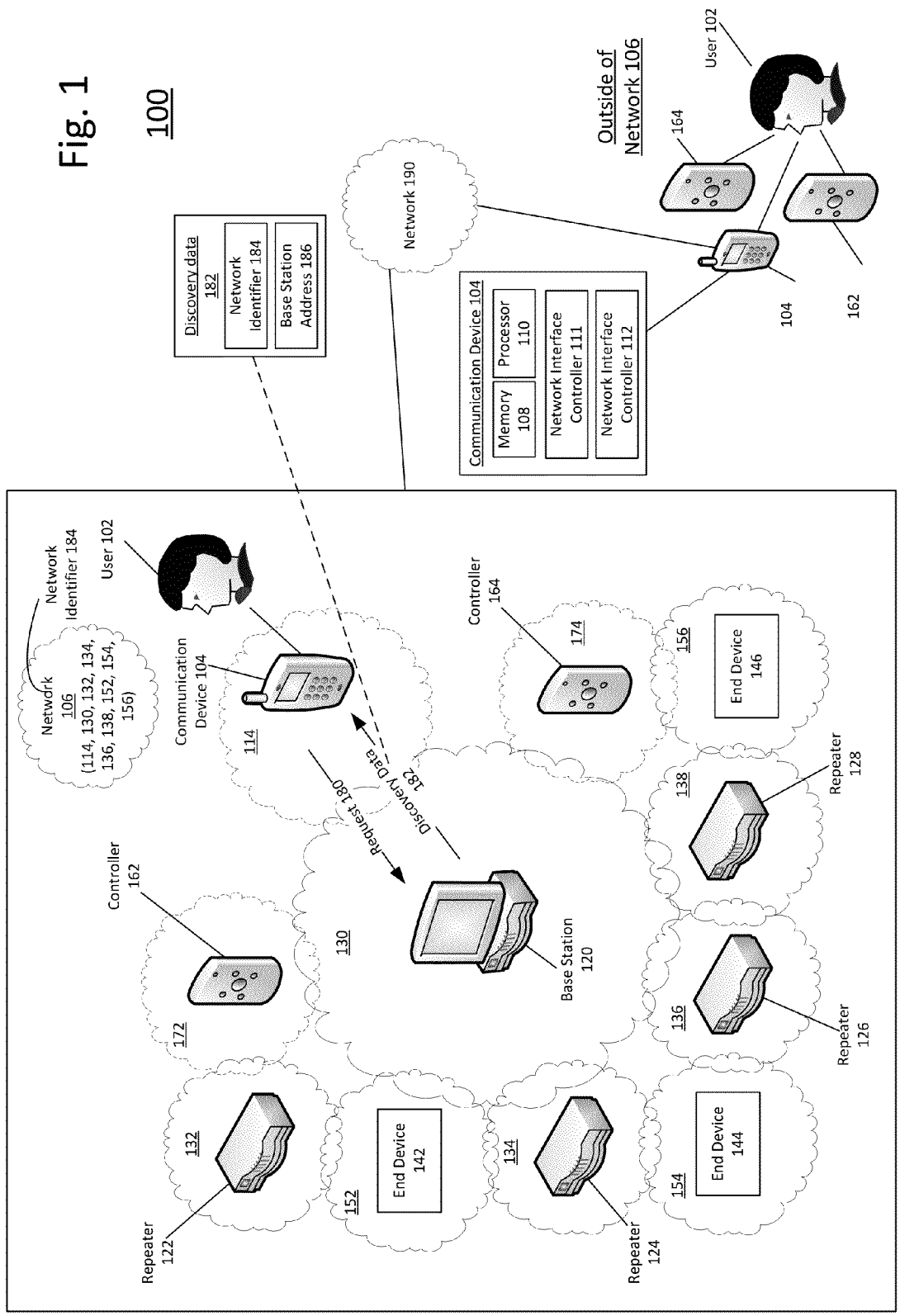
FIG. 1 illustrates an example system that can be utilized to implement repeater emulation to increase network range.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to repeater emulation to increase network range.

Briefly stated, technologies are generally described for methods and systems configured to increase a range of a network. In an example, a method for increasing a range of a first network may include sending a request by a communication device to a network device while the communication device is in a range of the first network. The request may include a request for discovery data that identifies the first network. The method may further include receiving, by the communication device, the discovery data. The method may further include broadcasting, by the communication device, information based on the discovery data when the communication device is outside the range of the first network and when the communication device is configured to communicate over a second network. The second network may be different from the first network.

FIG. 1 illustrates an example system that can be utilized to implement repeater emulation to increase network range, arranged in accordance with at least some embodiments described herein. As depicted, an example system 100 may include a communication device 104, a base station 120, one or more repeaters 122, 124, 126, 128, one or more end devices 142, 144, 146, and/or one or more controllers 162, 164. Communication device 104 may be, for example, a device capable of emulating a repeater such as a cellular phone, tablet, and/or laptop computer, etc. End devices 142, 144, 146 may be, for example, home appliances, sensors, alarms, personal health monitors, etc. Communication device 104 may include a memory 108, a processor 110, and/or one or more network interface controllers 111, 112.

Processor 110 may be configured to be in communication with memory 108 and/or network interface controllers 111, 112. Processor 110 may be configured to generate, send, and/or receive data. Processor 110 may be further configured to broadcast data through network interface controllers 111, 112. Processor 110 may be further configured to store and/or retrieve data in memory 108. Processor 110 may be further configured to determine a location of communication device 104 discussed in more detail herein. Network interface controllers 111, 112 may be configured to facilitate communication between communication device 104 and networks.

Base station 120 may be configured to communicate in a coverage area 130 and may store network addresses of repeaters 122, 124, 126, 128 and/or end devices 142, 144, 146. In some examples, base station 120 may be a repeater similar to repeaters 122, 124, 126, 128. In some examples, base station 120 may be a device configured to manage communication among repeaters 122, 124, 126, 128 and/or end devices 142, 144, 146. Base station 120 may be further configured to receive data broadcasted over a coverage area overlapping with coverage area 130. Base station 120 may be further configured transmit data to a repeater and/or end device with a coverage area overlapping coverage area 130. Base station 120 may be further configured to store data relating to positioning of coverage areas 130, 132, 134, 136, 138, 152, 154, 156. In some examples, data relating to positioning of coverage areas may be stored in a form of a network topology or link map. Base station 120 may be further configured to determine a path to transmit data when a designated end device does not have a coverage area overlapping coverage area 130.

Repeaters 122, 124, 126, 128 and/or end devices 142, 144, 146 may be configured to broadcast received data over respective coverage areas 132, 134, 136, 138, 152, 154, and 156. Communication device 104 may be configured to broadcast over a coverage area 114. A network 106 may be defined by a combination of coverage areas 114, 130, 132, 134, 136, 138, 152, 154 and 156 and may be identified by a network identifier 184. Network 106 may be a WPAN (wireless personal area network) such as ZIGBEE, Z-WAVE, X10, etc. configured to operate at particular radio bands such as the ISM (Industrial, Scientific, and Medical) radio bands. Controllers 162, 164 may be configured to generate signals to communicate with end devices 142, 144, 146. Signals generated by controllers 162, 164 may include requests to communicate with one or more end devices 142, 144, 146. Controllers 162, 164 may be further configured to broadcast generated signals over respective coverage areas 172, 174. In some examples, repeaters 122, 124, 126, 128, and/or controllers 162, 164 may include similar functionalities as end devices 142, 144, 146.

Each coverage area may overlap one or more other coverage areas. As illustrated in the example in FIG. 1, coverage area 138 overlaps coverage areas 130, 136, 156. Overlapping of coverage areas may allow direct transmission and/or receipt of data. For example, when base station 120 needs to transmit data to end device 144, base station 120 may first determine a path to transmit data to end device 144 by analyzing stored data relating to positions of coverage areas in network 106. After determining a path base station may transmit data including an address of end device 144 to repeater 126. Repeater 126 may broadcast the received data over coverage area 136. End device 144 may detect the broadcasted data based on the address of end device 144 and receive the broadcasted data.

Processor 110 may determine that communication device 104 is within a range of network 106. A user 102 may activate a discovery mode in communication device 104 in the range of network 106. While in discovery mode, communication device 104 may broadcast, such as by processor 110, a request 180 within a coverage area 114 of communication device 104. Request 180 may include, for example, log in credentials for network 106. Request 180 may further include an address of communication device 104 and/or a request for discovery data 182 to be transmitted to communication device 104. Discovery data 182 may include a combination of a network identifier 184 and/or a base station address 186. In an example, base station 120 may detect and/or receive request 180. Base station 120 may be configured to generate discovery data 182 in response to receiving request 180 and transmit discovery data 182 to communication device 104. Communication device 104 may receive, such as by processor 110, discovery data 182 and store discovery data 182 in memory 108. User 102 may disable discovery mode in communication device 104 in response to communication device 104 receiving discovery data 182.

As described in more detail below, communication device 104 may emulate one or more repeaters in network 106 based on discovery data 182. User 102 may continue to use controllers 162, 164 outside of the network range of network 106 to communicate with end devices 142, 144, 146 through communication device 104 and a network 190. As a result of, at least in part, communication device 104 emulating repeaters 122, 124, 126, 128, a network range of network 106 may be increased.

Figure 2:
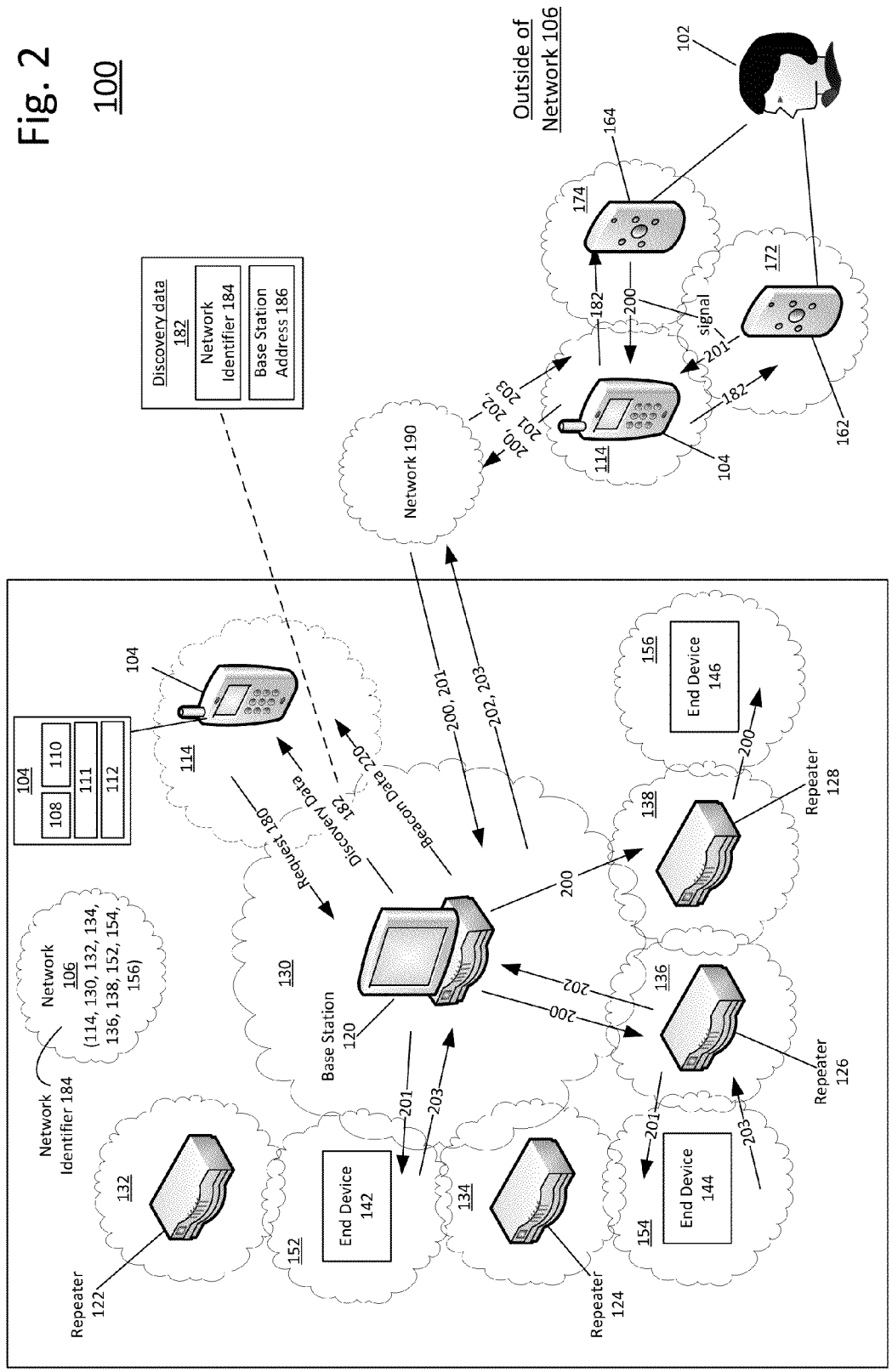
FIG. 2 illustrates the example system of FIG. 1 with additional detail relating to an implementation of repeater emulation to increase network range.

FIG. 2 illustrates the example system of FIG. 1 with additional detail relating to an implementation of repeater emulation to increase network range, arranged in accordance with at least some embodiments described here. FIG. 2 is substantially similar to system 100 of FIG. 1, with additional details. Those components in FIG. 2 that are labeled identically to components of FIG. 1 will not be described again for the purposes of clarity.

Communication device 104 and/or base station 120 may be configured to be in communication with each other such as through network 190. Communication device 104 may communicate with network 106 through network interface controller 111. Communication device 104 may communicate with network 190 through network interface controller 112. Processor 110 may determine that communication device 104 is outside the range of network 106. In some examples, processor 110 may initiate a handshaking process with network 106 through network interface controller 111 to determine if communication device 104 is outside the range of network 106. Processor 110 may broadcast information based on discovery data 182 in coverage area 114 through network interface controller 111 to emulate a repeater that has coverage area in network 106. Broadcast of information based on discovery data 182 by communication device 104 may indicate that communication device 104 may be configured to send data to base station 120 at base station address 186 in network 106 with network identifier 184. Activation of discovery mode in communication device 104 may be disabled when communication device 104 is outside the range of network 106.

In an example, controller 164 may be configured to activate or deactivate end device 146, and controller 162 may be configured to request data from end devices 142, 144. User 102 may move communication device 104 and controllers 162, 164 to be outside of the network range of network 106. Coverage area 114, 172, 174 may overlap each other outside of the network range of network 106. User 102 may activate end device 146 by using controller 164 to generate a signal 200. Signal 200 may include a request to activate and/or communicate with end device 146. Controller 164 may broadcast signal 200 over coverage area 174. Communication device 104 may receive signal 200 and format signal 200 into a data type suitable for network 190, such as IP (Internet Protocol) packets. Communication device 104 may output an indication of receipt of signal 200 in response to receiving signal 200. Communication device 104 may transmit formatted signal 200 to base station 120 through network 190. Controllers 162, 164 may be ineffective to communicate over network 190.

Base station 120 may receive formatted signal 200 and convert signal 200 to a data type suitable for network 106 such as by converting signal 200 to a frequency within the operating radio bands of network 106. In some examples, a device (not shown) such as a receiver or an adapter may format or convert signal 200 to a data type suitable for network 106. Base station 120 may analyze instructions in signal 200 and determine a path to transmit signal 200 to end device 146. Base station 120 may detect that coverage area 156 is not overlapping with coverage area 130 and transmit signal 200 to repeater 128. Repeater 128 may receive signal 200 and broadcast signal 200 over coverage area 138. End device 146 may detect signal 200 and receive signal 200. End device 146 may activate in response to end device 146 receiving signal 200.

In another example, end devices 142, 144 may each include one or more sensors and/or a processor configured to analyze received signals and generate data based on data received at the one or more sensors. User 102 may request data from end devices 142, 144. User 102 may use controller 162 to generate signal 201. Signal 201 may include request for data 203 and/or communication with end devices 142, 144. Controller 162 may broadcast signal 201 over coverage area 172. Communication device 104 may receive signal 201 and format signal 201 into a data type suitable for network 190. Communication device 104 may output an indication of receipt of signal 201 in response to receiving signal 201. Communication device 104 may transmit formatted signal 201 to base station 120 through network 190.

Base station 120 may receive signal 201 and convert signal 201 to a data type suitable for network 106. Base station 120 may analyze instructions in signal 201 and determine a path to transmit signal 201 to end devices 142, 144. Base station 120 may detect that coverage area 152 is overlapping coverage area 130 and transmit signal 201 to end device 142. Base station 120 may detect that coverage area 154 is not overlapping coverage area 130 and transmit signal 201 to repeater 124. Repeater 124 may receive signal 201 and broadcast signal 201 over coverage area 134. End device 144 may detect signal 201 and receive signal 201.

End devices 142, 144 may analyze signal 201 and generate data 203. End device 142 may directly transmit data 203 to base station 120. End device 144 may broadcast data 203 over coverage area 154. Repeater 124 may receive data 203 and broadcast data 203 over coverage area 134. Base station 120 may receive data 203 from coverage area 134. Base station 120, a repeater, or another device (not shown) may combine data 203 received from end devices 142, 144 and format data 203 into a data type suitable for network 190. Base station 120 may transmit formatted data 203 to communication device 104 through network 190. Communication device 104 may receive data 203 and convert data 203 to a data type suitable for network 106. In some examples, communication device 104 may include software to display data 203 on communication device 104.

In an example, end devices 142, 144, 146 may be occupancy sensors effective to detect if a person is inside the range of network 106. End device 142 may be configured to be activated for duration of 20 seconds in every 30 minutes. End device 144 may be configured to be activated for duration of 30 seconds in every 30 minutes. End device 146 may be configured to be activated for duration of 15 seconds in every 30 minutes. Discovery data 182 may include network identifier 184 and/or base station address 186.

Communication device 104 may know from discovery data 182 that network 106 is of a type that uses beacons to reduce the frequency of communication between elements. In such a case, communication device 104 may undertake a listening period upon determining that communication device 104 is outside of network 106. In the listening period, communication device 104 may listen for beacons, or for re-establishment messages after missed beacons, from devices such as controllers 162 and 164 that have left network 106 and are proximate to device 104. In examples where communication device 104 establishes itself as point of contact for network 106 of devices 162 and 164, such as by emulating a repeater, communication device 104 may accept beacon period information and use the period to control network interface controller 111 to match those periods thereby saving power.

Figure 3:
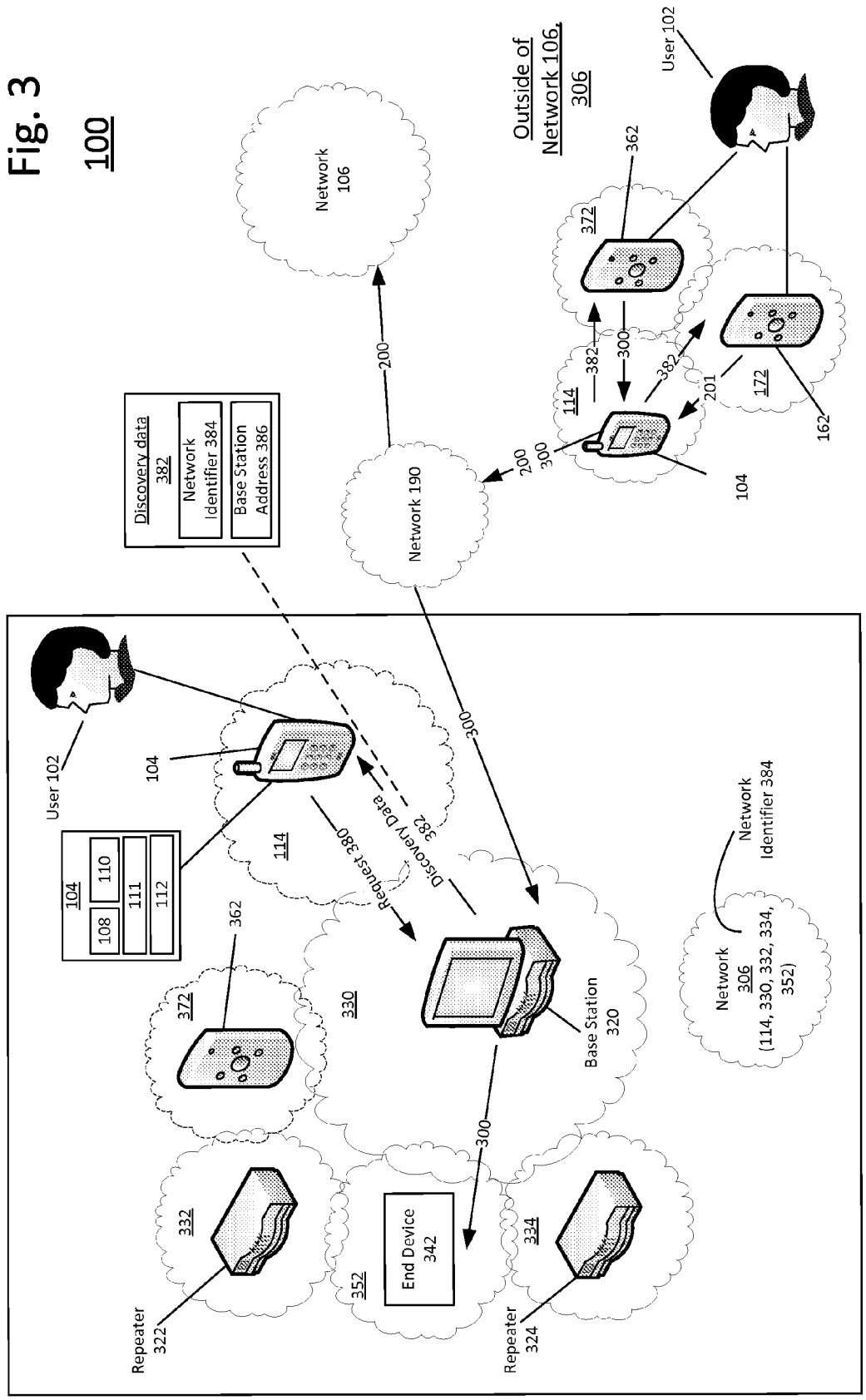
FIG. 3 illustrates the example system of FIG. 1 with additional detail relating to an implementation of repeater emulation to increase network range of two different networks.

FIG. 3 illustrates the example system of FIG. 1 with additional detail relating to an implementation of repeater emulation to increase network range of two different networks, arranged in accordance with at least some embodiments described here. FIG. 3 is substantially similar to FIG. 1 and FIG. 2, with additional details. Those components in FIG. 3 that are labeled identically to components of FIG. 1 and FIG. 2 will not be described again for the purposes of clarity.

Example system 100 may further include a base station 320, one or more repeaters 322, 324, one or more end devices 342 and/or one or more controllers 362. Base station 320 may communicate in a coverage area 330 and may store network addresses of repeaters 322, 324 and/or end device 342. Base station 320 may be configured to receive data broadcasted over a coverage area overlapping with coverage area 330. Base station 320 may be further configured to transmit data to a repeater and/or end device with a coverage area overlapping coverage area 330. Base station 320 may be further configured to determine a path to transmit data when a designated end device does not have a coverage area overlapping coverage area 330.

Repeaters 322, 324 and/or end devices 342 may be configured to broadcast received data over respective coverage areas 332, 334, 352. A network 306 may be defined by a combination of coverage areas 114, 330, 332, 334, 352 and may be identified by a network identifier 384. Network 306 may be a WPAN (wireless personal area network) such as ZIGBEE, Z-WAVE, X10, etc. Controller 362 may be configured to generate signals to communicate with end device 342. Signals generated by controller 362 may include requests to communicate with one or more end devices 342. Controller 362 may be further configured to broadcast generated signals over coverage area 372.

Processor 110 may determine that communication device 104 is in a range of network 306 and may communicate with network 306 through network interface controller 111. User 102 may activate a discovery mode in communication device 104 in a network range of network 306. While in discovery mode, communication device 104 may broadcast a request 380 within a coverage area 114. Request 380 may include an address of communication device 104 and/or a request for discovery data 382 to be transmitted to communication device 104. Discovery data 382 may include network identifier 384 and/or base station address 386. In an example, base station 320 may detect and/or receive request 380. Base station 320 may be configured to generate discovery data 382 in response to receiving request 380 and transmit discovery data 382 to communication device 104. Base station 320 may identify communication device 104 as a repeater for network 306 in response to transmitting discovery data 382. Communication device 104 may receive discovery data 382 and store discovery data 382 in memory 108. User 102 may disable discovery mode in communication device 104 in response to communication device 104 receiving discovery data 382.

User 102 may move communication device 104 outside of network 106 and network 206. Base station 320 may be configured to be in communication with network 190. Processor 110 may determine that communication device 104 is outside the range of network 306 and may broadcast information based on discovery data 382 in coverage area 114 through network interface controller 111 to emulate a repeater that has a coverage area in network 306. Communication device 104 may also broadcast information based on discovery data 182 in coverage area 114 through network interface controller 111 to emulate a repeater that has coverage area in network 106.

In an example, user 102 may move communication device 104 and controllers 162, 362 to be outside of the network range of network 106, 306. Coverage area 114, 172, 372 may overlap each other outside of the network range of network 106, 306. User 102 may use controllers 162, 362 to communicate with end devices 142, 144 and end device 342, respectively. For example, user 102 may activate end device 342 by using controller 362. User 102 may use controllers 162, 362 to respectively generate signals 201, 300. Signals 201, 300 may include requests to activate and/or communicate with end devices 142, 144, and end device 342, respectively. Controller 162 may broadcast signal 201 over coverage area 172. Controller 362 may broadcast signal 300 over coverage area 372. Communication device 104 may transmit formatted signal 200 to base station 120 in network 106 through network 190 based on base station address 186 and network identifier 184. Communication device 104 may transmit formatted signal 300 to base station 320 in network 306 through network 190 based on base station address 386 and network identifier 384.

Base station 320 may receive signal 300 and convert signal 300 to a data type suitable for network 306. Base station 320 may analyze instructions in signal 300 and detect that coverage area 352 is overlapping coverage area 330. Base station 320 may transmit signal 300 to end device 342. End device 342 may receive signal 300. End device 342 may activate in response to end device 342 receiving signal 300. Similarly, end devices 142, 144 may activate in response to receiving signal 200.

Figure 4:
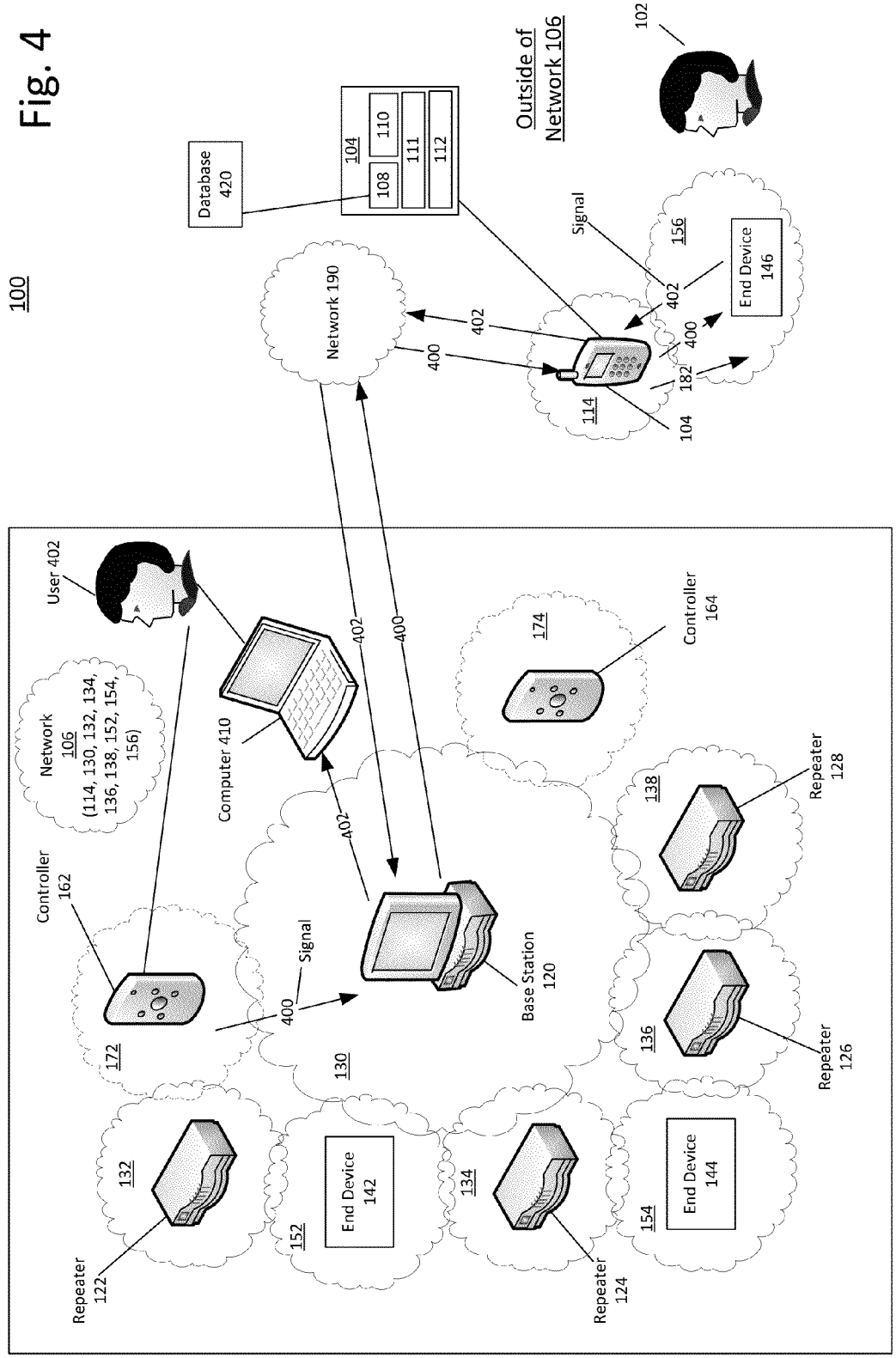
FIG. 4 illustrates the example system of FIG. 1 with additional detail relating to another implementation of repeater emulation to increase network range.

FIG. 4 illustrates the example system of FIG. 1 with additional detail relating to another implementation of repeater emulation to increase network range, arranged in accordance with at least some embodiments described herein. FIG. 4 is substantially similar to FIG. 3, with additional details. Those components in FIG. 4 that are labeled identically to components of FIG. 1, FIG. 2 and FIG. 3 will not be described again for the purposes of clarity.

In an example, end device 146 may be a medication dispenser. Processor 110 may determine that communication device 104 is outside the range of network 106 and may broadcast information based on discovery data 182 in coverage area 114 through network interface controller 111 to emulate a repeater that has coverage area in network 106.

End device 146 may dispense medication for user 102. User 102 may remove medication from end device 146. End device 146 may generate a signal 402 in response to removal of medication from end device 146. Signal 402 may include messages indicating that medication has been removed from end device 146. End device 146 may broadcast signal 402 over coverage area 156. Communication device 104 may receive signal 402 and format signal 402 into a data type suitable for network 190. Communication device 104 may transmit formatted signal 402 to base station 120 through network 190. Base station 120 may receive signal 402 and convert signal 402 to a data type suitable for network 106. Base station 120 may transmit signal 402 to a computer 410. Computer 410 may include memory configured to store signal 402 and software configured to show data corresponding to signal 402.

In some examples, communication device 104 may store a database 420 in memory 108. Database 420 may include data corresponding to one or more networks 106, 306 associated with communication device 104. For example, database 420 may include data that may be used to output whether communication device 104 is emulating a repeater of network 106, or network 306, or both networks 106 and 306. In other examples, database 420 may include data effective to indicate that one or more communication devices are emulating a repeater of networks 106, 306. For example, database 420 may include data that may be used to output an indication that communication devices other than communication device 104 are emulating as repeaters in network 106 and/or network 306.

Among other possible benefits, a system in accordance with the disclosure may be able to increase a range of a network. For example, a range of ZIGBEE network may be increased without requiring the implementation of a dedicated software application. Controllers that may be used in one network may be still useful in locations outside of the network and need not be re-programmed. Monitoring devices such as medication dispensers set up in one network may continue to work even outside of the network.

In an example, a system may allow a user in a network to monitor one or more other users outside of the range of the network. For example, an employer of a company providing delivery services may monitor delivery truck drivers when delivery truck drivers carry a controller and/or a communication device capable of emulating a repeater of a network. End devices may be distributed at various locations. Delivery truck drivers may arrive at locations with end devices and use the controller to communicate with the end device to generate a status signal. Status signals may include check-in, items delivered, failure to deliver, etc. End devices receiving the status signals may broadcast the status signal. Communication devices carried by delivery truck drivers may receive the status signals and send the status signals to a base station inside the network. The employer may monitor delivery truck driver activities and/or locations without installing additional devices, such as GPS (Geographic Positioning Systems) devices in delivery trucks.

Figure 5:
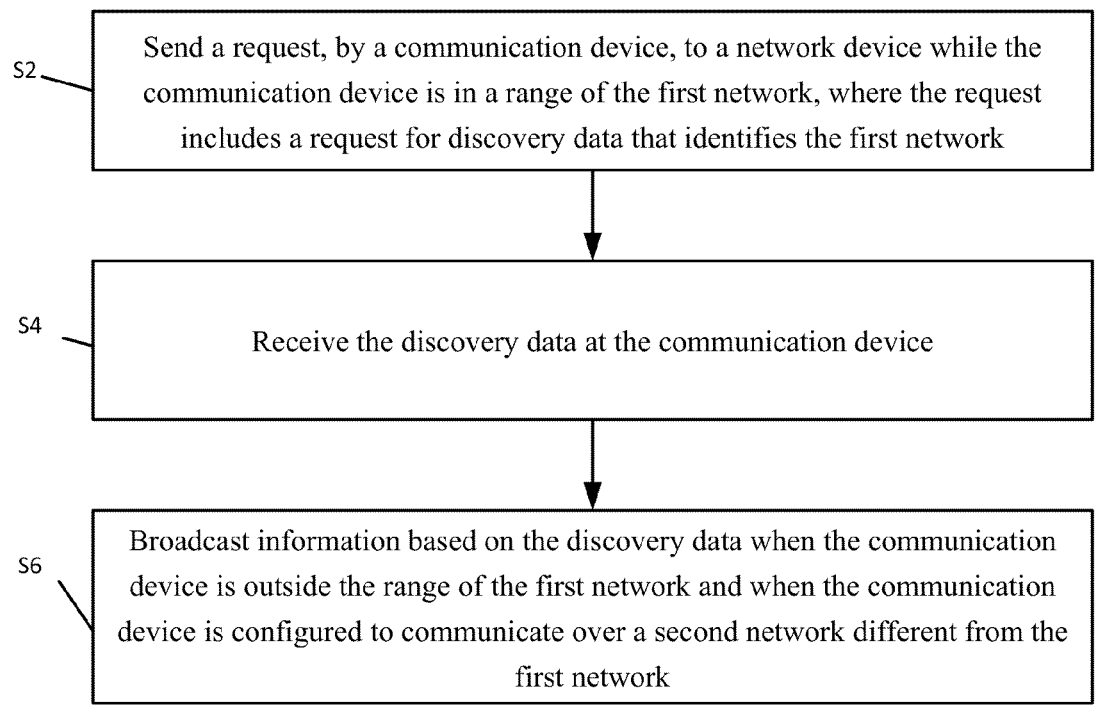
FIG. 5 illustrates a flow diagram for an example process for implementing repeater emulation to increase network range.

FIG. 5 illustrates a flow diagram for an example process for implementing repeater emulation to increase network range, arranged in accordance with at least some embodiments presented herein. The process in FIG. 5 could be implemented using, for example, system 100 discussed above. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation.

Processing may begin at block S2, "Send a request, by a communication device, to a network device while the communication device is in a range of the first network, where the request includes a request for discovery data that identifies the first network." At block S2, a communication device may send a request to a network device in a first network while the communication device is in a range of the first network. The request may include a request for discovery data that identifies the first network. The discovery data may be a combination of a network identifier and an address that identifies the network device. Prior to the communication device sending the request, the communication device may determine that the communication device is within the range of the first network.

Processing may continue from block S2 to S4, "Receive the discovery data at the communication device." At block S4, the communication device may receive the discovery data.

Processing may continue from block S4 to S6, "Broadcast information based on the discovery data when the communication device is outside the range of the first network and when the communication device is configured to communicate over a second network different from the first network." The communication device may broadcast information based on the discovery data when the communication device is outside the range of the first network. The communication device may be configured to be in communication with a second network. The second network may be different from the first network.

The communication device may determine that the communication device is outside the range of the first network prior to broadcasting the information based on discovery data. In an example, while the communication device is outside the range of the first network, the communication device may receive a signal from a controller. The signal may include a request to communicate with an end device inside the range of the first network. The communication device may transmit the signal to the network device through the second network. The communication device may output an indication of receipt of the signal prior to transmitting the signal to the network device. The controller may be configured to communicate over the first network when the controller is in the range of the first network. The controller may be ineffective to communicate over the second network.

In another example, the network device may receive a signal from a controller within the range of the first network. The signal may include a request to communicate with an end device outside the range of the first network. The network device may transmit the signal to the communication device through the second network.

Figure 6:
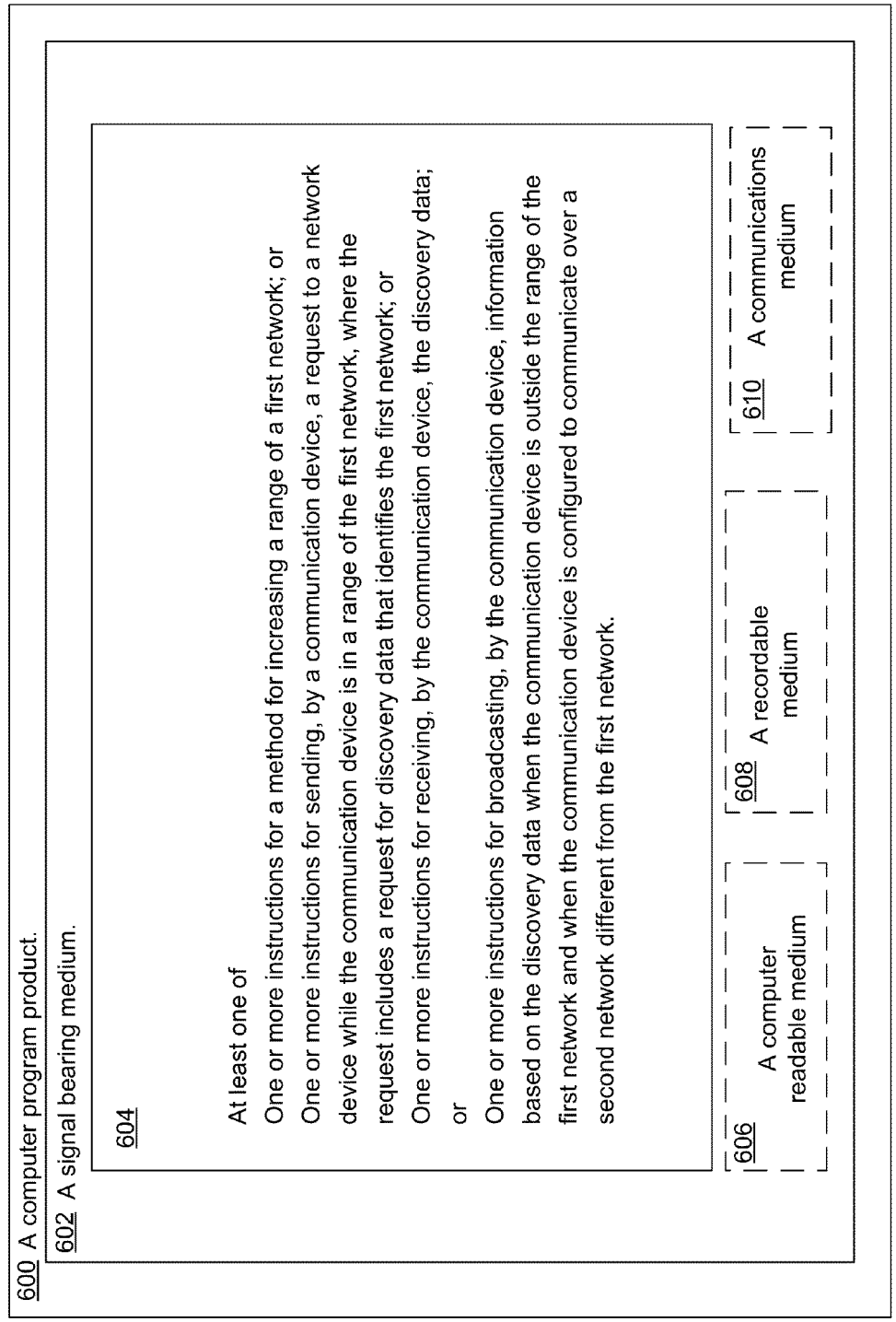
FIG. 6 illustrates an example computer program product that can be utilized to implement repeater emulation to increase network range.

FIG. 6 illustrates an example computer program product 600 that can be utilized to implement repeater emulation to increase network range, arranged in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. Thus, for example, referring to system 100, processor 110 in communication device 104 may undertake one or more of the blocks shown in FIG. 6 in response to instructions 604 conveyed to the system 100 by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement repeater emulation to increase network range, arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a repeater emulation algorithm 726 that is arranged to perform the functions as described herein including those described with respect to system 100 of FIGS. 1-6. Program data 724 may include repeater emulation data 728 that may be useful to implement repeater emulation to increase network range as is described herein. In some embodiments, application 722 may be arranged to operate with program data 724 on operating system 720 such that repeater emulation to increase network range may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for increasing a range of a first network, the method comprising:

sending a request, by a communication device, to a network device while the communication device is in a range of the first network, where the request includes a request for discovery data that identifies the first network;

receiving, by the communication device, the discovery data; and broadcasting, by the communication device, information based on the discovery data when the communication device is outside the range of the first network and when the communication device is configured to communicate over a second network different from the first network, wherein the broadcasted information is effective to indicate that the communication device is configured to communicate with the first network.

2. The method of claim 1, wherein the discovery data is a combination of a network identifier and an address that identifies the network device.

3. The method of claim 1, further comprising, by the communication device, prior to sending the request, determining that the communication device is within the range of the first network.

4. The method of claim 1, further comprising, by the communication device, prior to broadcasting, determining that the communication device is outside the range of the first network.

5. The method of claim 1, further comprising, by the communication device:

receiving a signal from a controller, wherein the signal includes a request to communicate with an end device inside the range of the first network; and transmitting the signal to the network device through the second network.

6. The method of claim 5, wherein the controller is configured to communicate over the first network when the controller is in the range of the first network and the controller is ineffective to communicate over the second network.

7. The method of claim 5, further comprising, prior to transmitting the signal to the network device, outputting an indication of receipt of the signal by the communication device.

8. The method of claim 1, further comprising, by the communication device, communicating with the end device at communication beacon periods based on a beacon timing requirement.

9. The method of claim 1, further comprising, by the network device:

receiving a signal from a controller, wherein the signal includes a request to communicate with an end device outside the range of the first network; and transmitting the signal to the communication device through the second network.

10. A device configured to increase a range of a first network, the device comprising:

a memory;

a first network interface controller;

a second network interface controller; and a processor configured to be in communication with the memory, the first network interface controller and the second network interface controller; wherein:

the processor is configured to generate and send a request through the first network interface controller to a network device while the device is in the range of the first network, where the request includes a request for discovery data that identifies the first network;

the processor is further configured to receive the discovery data and store the discovery data in the memory; and the processor is configured to broadcast information based on the discovery data through the first network interface controller when the device is outside the range of the first network and when the device is configured to communicate over a second network through the second network interface controller, where the second network is different from the first network, and where the broadcasted information is effective to indicate that the communication device is configured to communicate with the first network.

11. The device of claim 10, wherein the processor is configured to determine that the communication device is within the range of the first network.

12. The device of claim 10, wherein the processor is further configured to:
receive a signal from a controller, wherein the signal includes a request to communicate with an end device inside the range of the first network; and
transmit the signal to the network device through the second network.

13. The device of claim 12, wherein the processor is further configured to output an indication of receipt of the signal by the communication device.

14. The device of claim 10, wherein the processor is further configured to communicate with the end device at communication beacon periods based on a beacon timing requirement.

15. A system configured to increase a range of a first network, the system comprising:
an end device;
a network device in the range of the first network and configured to be in communication with the end device;
a controller; and
a communication device;
wherein:
the communication device is configured to send a request to the network device while the communication device is in the range of the first network, where the request includes a request for discovery data that identifies the first network;
the network device is configured to receive the request and send the discovery data to the communication device in response; and the communication device is further configured to:
receive the discovery data;
broadcast information based on the discovery data when the communication device is outside the range of the first network and when the communication device is configured to communicate over a second network different from the first network, wherein the broadcasted information is effective to indicate that the communication device is configured to communicate with the first network;
receive a signal from the controller, wherein the signal includes a request to communicate with the end device inside the range of the first network; and
transmit the signal to the network device through the second network.

16. The system of claim 15, wherein:
the communication device is configured to determine, prior to the request, that the communication device is within the range of the first network; and
the communication device is configured to determine, prior to broadcast, that the communication device is outside the range of the first network.

17. The system of claim 15, wherein the controller is configured to communicate over the first network when the controller is in the range of the first network and the controller is ineffective to communicate over the second network.

18. The system of claim 15, wherein the communication device is configured to, prior to transmission of the signal to the network device, output an indication of receipt of the signal by the communication device.

19. The system of claim 15, wherein the communication device is further configured to communicate with the end device at communication beacon periods based on a beacon timing requirement.

20. The system of claim 15, wherein:
the controller is a first controller;
the end device is a first end device;
the signal is a first signal;
and the system further comprises:
a second controller;
and the network device is configured to receive a second signal from the second controller, wherein the second signal includes a request to communicate with a second end device outside the range of the first network; and
the network device is configured to transmit the second signal to the communication device through the second network.

* * * * *